United States Patent
Triteyaprasert

(10) Patent No.: US 7,551,847 B2
(45) Date of Patent: Jun. 23, 2009

(54) IMAGE PICKUP APPARATUS AND METHOD AND PROGRAM

(75) Inventor: Soroj Triteyaprasert, Tokyo (JP)

(73) Assignee: Sony Corporation, Tokyo (JP)

( * ) Notice: Subject to any disclaimer, the term of this patent is extended or adjusted under 35 U.S.C. 154(b) by 554 days.

(21) Appl. No.: 11/317,726

(22) Filed: Dec. 23, 2005

(65) Prior Publication Data

US 2006/0198621 A1    Sep. 7, 2006

(30) Foreign Application Priority Data

Dec. 27, 2004    (JP)    ............... 2004-375917

(51) Int. Cl.
G03B 17/00    (2006.01)
G03B 3/10    (2006.01)
G03B 13/34    (2006.01)
G02B 15/22    (2006.01)

(52) U.S. Cl. ............... 396/79; 396/82; 396/85; 396/131; 359/693; 359/705; 348/240.3; 348/345

(58) Field of Classification Search ............... 396/72, 396/79–83, 85–88, 131, 137; 348/240.99, 348/240.3, 345, 347; 359/676, 693, 698, 359/705

See application file for complete search history.

(56) References Cited

U.S. PATENT DOCUMENTS 5,587,842 A * 12/1996 Iijima et al. ............... 359/698

FOREIGN PATENT DOCUMENTS

| JP | 9 152551 | 6/1997 |
| JP | 2001 208955 | 8/2001 |

* cited by examiner

*Primary Examiner*—Rochelle-Ann J Blackman
(74) *Attorney, Agent, or Firm*—Frommer Lawrence & Haug LLP; William S. Frommer

(57) ABSTRACT

When focus is to be achieved in manual focus, accurate and quick focus is attained when switched from a telemacro mode to a normal mode. An image pickup apparatus includes: a shooting mode determining module; a zoom lens drive module; a focus lens drive module; a storing module; and a control module wherein a combination point of a position of a focus lens with a position of a zoom lens is moved along a path of a combination point of a position of the focus lens with a position of the zoom lens that is focused at the shooting distance stored by the storing module in response to manipulation to change a focal length by a user, when it is determined that the shooting mode determining module has switched from the telemacro mode to the normal mode.

5 Claims, 5 Drawing Sheets

IMAGE PICKUP APPARATUS AND METHOD AND PROGRAM

CROSS REFERENCE TO RELATED APPLICATIONS

The present invention contains subject matter related to Japanese Patent Application JP 2004-1375917 filed in the Japanese Patent Office on Dec. 27, 2004, the entire contents of which being incorporated herein by reference.

BACKGROUND OF THE INVENTION

1. Field of the Invention

The present invention relates to an image pickup apparatus and a method, and a program, particularly to an image pickup apparatus and a method, and a program which a shooting distance focused in a macro mode is held and switched to a normal mode, and then the held shooting distance can be diverted for another use.

2. Description of the Related Art

Traditionally, for a digital still camera, a digital video camera, etc (hereinafter, simply called a digital camera), there are many cameras having an auto-focus function, a zoom function, and a macro shooting function (for example, see Patent Reference 1).

The auto-focus function is a function that can automatically focus on a subject. The auto-focus function implements focus on the subject in which an image including the subject is continuously obtained while a focus lens is being driven, a high frequency component of the obtained image (which correspond to the outline of the subject) is extracted to detect the sharpness of that image, and the focus lens is stopped at the position where the detected sharpness becomes the largest value or the maximum value. It is called manual focus that the auto-focus function is canceled and the focus lens is driven by user manipulation for focusing.

The zoom function is a function that can continuously vary a focal length in accordance with user manipulation to freely adjust the angle of view of an image to be taken between a wide angle side and a telescope side. Hereinafter, the end on the telescope side is called a tele-end and the end on the wide angle side is called a wide-end in the zoom function.

The macro shooting function is a function that can achieve focus at a minimum lens-to-subject distance that may not be focused in a typical shooting mode (hereinafter, it is called a normal mode). Hereinafter, the state that the macro shooting function is operable is called a macro mode. Particularly, when an optical system adopted in the digital camera is in an inner focus mode, a zoom lens is fixed on the tele-end, the operation range of the focus lens is extended to the minimum distance side than the normal mode, and then the macro shooting function is implemented. Then, the macro shooting function in the digital camera that adopts the optical system in the inner focus mode is called a telemacro function. The state that the telemacro function is operable is called a telemacro mode.

Furthermore, in the operation range of the focus lens in the normal mode, the maximum lens-to-subject side is called infinity, the minimum lens-to-subject side is called a minimum normal end. In the operation range of the focus lens in the macro mode, the minimum lens-to-subject side is called a minimum macro end.

Patent Reference 1: JP-A-2001-208955

SUMMARY OF THE INVENTION

In the meantime, the zoom lens generally has a narrower depth of field on the telescope side than the depth of field on the wide angle side. Therefore, when the zoom lens is moved to the telescope side for focusing, more accurate focus can be achieved than focus on the wide angle side. For a user of a camera who well knows the characteristics of the zoom lens, the user takes a scheme in which when focus is to be achieved in manual focus, the zoom lens is moved on the telescope side, the focus lens is adjusted into focus, and then the zoom lens is moved to a desired angle of view for shooting.

When such the scheme is applied and the shooting distance obtained in the telemacro mode can also be used in the normal mode, improved manipulation properties for users can be expected. However, in the digital camera that adopts the optical system in the inner focus mode, it does not include an operation area for a point that represents a combination of the position of the zoom lens with the position of the focus lens in the telemacro mode within an operation area for a point that represents a combination of the position of the zoom lens with the position of the focus lens in the normal mode, and thus it has a problem that it may not adopt the scheme described above.

The invention has been made in view of the circumstances. It is desirable to allow a shooting distance obtained in the telemacro mode to be also used in the normal mode when focus is to be achieved in manual focus.

An image pickup apparatus according to an embodiment of the invention is an image pickup apparatus including:

a shooting mode determining module which determines an instruction to switch between a telemacro mode where a telemacro shooting function is operable and a normal mode where the telemacro shooting function is not operable;

a zoom lens drive module which drives a zoom lens to adjust a focal length;

a focus lens drive module which drives a focus lens to adjust a shooting distance;

a storing module which stores a shooting distance in the telemacro mode before switched when it is determined that the shooting mode determining module has switched from the telemacro mode to the normal mode; and a control module which controls the focus lens drive module and the zoom lens drive module, and moves a combination point of a position of the focus lens with a position of the zoom lens along a path of a combination point of a position of the focus lens with a position of the zoom lens that is focused at the shooting distance stored by the storing module in response to manipulation to change a focal length by a user, when it is determined that the shooting mode determining module has switched from the telemacro mode to the normal mode.

When it is determined that the shooting mode determining module has switched from the telemacro mode to the normal mode, the control module can:

control the focus lens drive module and move the position of the focus lens to a minimum end in the normal mode when the position of the focus lens is located on a distance closer than a minimum end in the normal mode;

control the focus lens drive module and the zoom lens drive module in response to manipulation to change a focal length by a user;

move the combination point of the position of the focus lens with the position of the zoom lens along a path of a combination point of a position of the focus lens with a position of the zoom lens that is focused at a the tele-end of the zoom lens; and after that, move it along a path of a combination point of a position of the focus lens with a position of the zoom lens that is focused at the shooting distance stored by the storing module.

The shooting mode determining module can determine that it has been switched from the telemacro mode to the normal mode in response to user manipulation to a switch which instructs switching between the telemacro mode and the normal mode or user manipulation to move a focal length of the zoom lens to a wide side.

An image pickup method according to an embodiment of the invention is an image pickup method including the steps of:

a shooting mode determining step which determines an instruction to switch between a telemacro mode where a telemacro shooting function is operable and a normal mode where the telemacro shooting function is not operable;

a storing step which stores a shooting distance in the telemacro mode before switched when it is determined that it has been switched from the telemacro mode to the normal mode in a process at the shooting mode determining step; and a controlling step which controls the focus lens drive module and the zoom lens drive module, and moves a combination point of a position of the focus lens with a position of the zoom lens on a path of a combination point of a position of the focus lens with a position of the zoom lens that is focused at the shooting distance stored by the storing module in response to manipulation to change a focal length by a user, when it is determined that it has been switched from the telemacro mode to the normal mode in the process at the shooting mode determining step.

A program according to an embodiment of the invention is a program allowing a computer to implement:

a shooting mode determining step which determines an instruction to switch between a telemacro mode where a telemacro shooting function is operable and a normal mode where the telemacro shooting function is not operable;

a storing step which stores a shooting distance in the telemacro mode before switched when it is determined that it has been switched from the telemacro mode to the normal mode in a process at the shooting mode determining step; and a controlling step which controls the focus lens drive module and the zoom lens drive module, and moves a combination point of a position of the focus lens with a position of the zoom lens on a path of a combination point of a position of the focus lens with a position of the zoom lens that is focused at the shooting distance stored by the storing module in response to manipulation to change a focal length by a user, when it is determined that it has been switched from the telemacro mode to the normal mode in the process at the shooting mode determining step.

In the image pickup apparatus and the image pickup method, and the program according to embodiments of the invention, the combination point of the position of the focus lens with the position of the zoom lens on the path of the combination point of the position of the focus lens with the position of the zoom lens that is focused at the shooting distance stored by the storing module in response to manipulation to change a focal length by a user, when it is determined that it has been switched from the telemacro mode to the normal mode.

According to the invention, when focus is to be achieved in manual focus, the shooting distance obtained in the telemacro mode can be used in the normal mode. Therefore, accurate and quick focus can be attained when switched from the telemacro mode to the normal mode.

DESCRIPTION OF THE PREFERRED EMBODIMENT

Hereinafter, an embodiment of the invention will be described. When the correspondence between components described in claims and specific examples in the embodiment of the invention is exemplified as follows. This description is made in order to confirm that specific examples that support the invention described in claims are described in the embodiment of the invention. Therefore, even though there is a specific example that is described in the embodiment of the invention but not described here as it corresponds to a component, it does not mean that that specific example does not correspond to that component. In reverse, even though a specific example is described here as it corresponds to a component, it does not mean that that specific example does not correspond to other components except that component.

Furthermore, this description does not mean that all the inventions corresponding to specific examples described in the embodiment of the invention do not described in claims. In other words, this description is inventions corresponding to specific examples described in the embodiment of the invention, which will not deny the existence of inventions that are not described in the claims of the present application, that is, the existence of inventions that will be filed by a divisional application, or added by an amendment.

Figure 1:
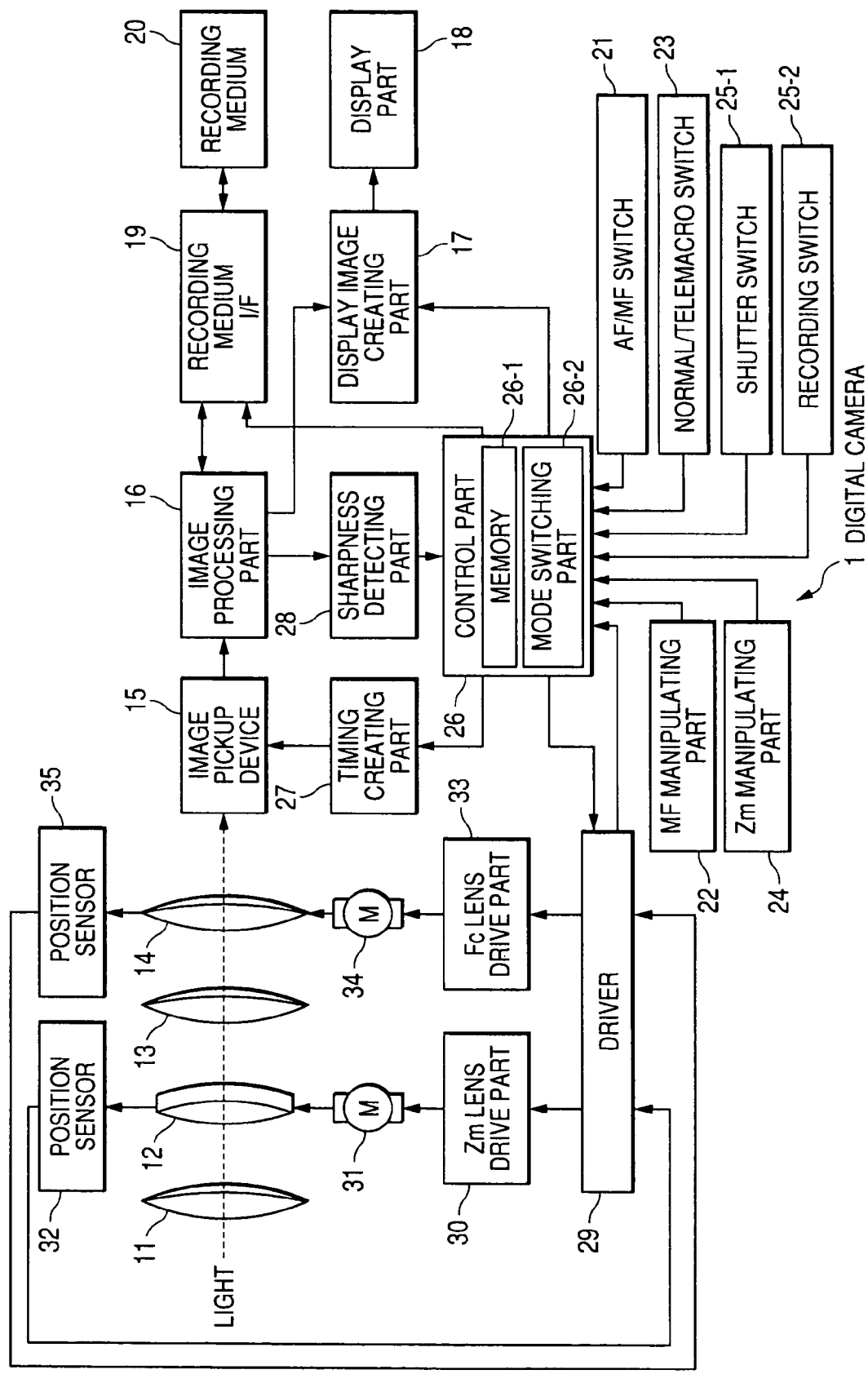
FIG. 1 is a block diagram illustrating an exemplary configuration of a digital camera to which the invention is adapted.

An image pickup apparatus according to an embodiment of the invention (for example, a digital camera 1 shown in FIG. 1) includes a shooting mode determining module which determines an instruction to switch between the telemacro mode where the telemacro shooting function is operable and the normal mode where the telemacro shooting function is not operable (for example, a mode switching part 26-2 in FIG. 1), a zoom lens drive module which drives a zoom lens to adjust a focal length (for example, a Zm lens drive part 30 in FIG. 1), a focus lens drive module which drives a focus lens to adjust a shooting distance (for example, a Fc lens drive part 33 in FIG. 1), a storing module which stores a shooting distance in the telemacro mode before switched when it is determined that the shooting mode determining module has switched from the telemacro mode to the normal mode (for example, memory 26-1 in FIG. 1), and a control module which controls the focus lens drive module and the zoom lens drive module and moves a combination point of the position of the focus lens with the position of the zoom lens along a path of a combination point of the position of the focus lens with the position of the zoom lens that focuses on the shooting distance stored by the storing module, when it is determined that the shooting mode determining module has switched from the telemacro mode to the normal mode in response to manipulation to change a focal length by a user (for example, a control part 26 in FIG. 1).

The shooting mode determining module according to an embodiment of the invention determines that it has been switched from the telemacro mode to the normal mode in response to user manipulation to a switch which instructs switching between the telemacro mode and the normal mode (for example, a normal/telemacro switch 23 in FIG. 1), or in response to user manipulation to move a focal length of a zoom lens to the wide side (for example, manipulation to a Zm manipulating part 24).

Figure 4:
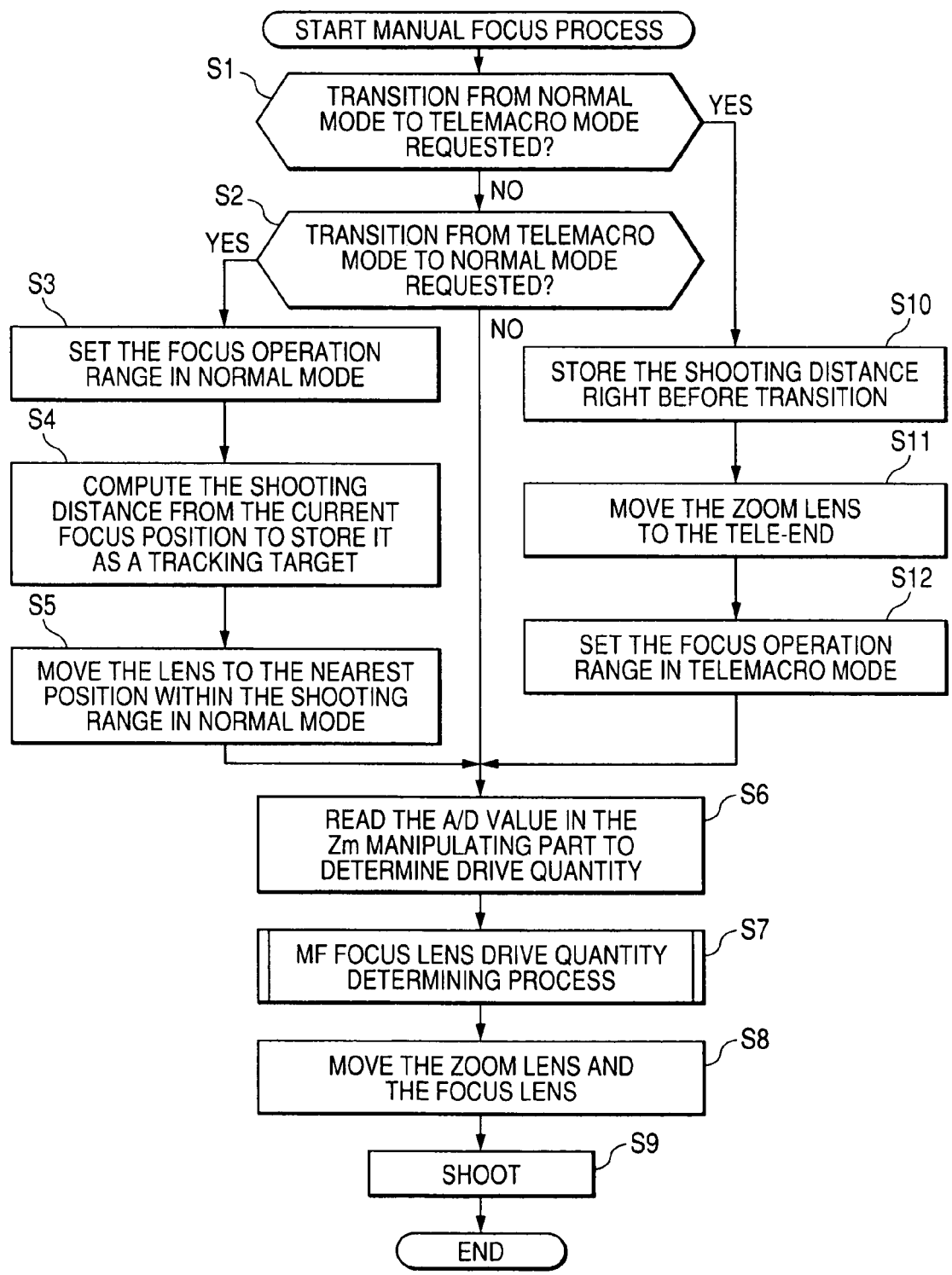
FIG. 4 is a flow hart illustrative of a manual focus process by the digital camera shown in FIG. 1.

An image pickup method according to an embodiment of the invention includes a shooting mode determining step which determines an instruction to switch between the telemacro mode where the telemacro shooting function is operable and the normal mode where the telemacro shooting function is not operable (for example, Step S2 in FIG. 4), a storing step which stores a shooting distance in the telemacro mode before switched, when it is determined that it has been switched from the telemacro mode to the normal mode in the process at the shooting mode determining step (for example, Step S4 in FIG. 4), and a controlling step which controls the focus lens drive module and the zoom lens drive module and moves the combination point of the position of the focus lens with the position of the zoom lens on a path of the combination point of the position of the focus lens with the position of the zoom lens that focuses on the shooting distance stored by the storing module, when it is determined that the shooting mode determining module switches from the telemacro mode to the normal mode in response to manipulation to change a focal length by a user (for example, Steps S5 to S8 in FIG. 4).

In addition, the correspondence between components described in a program of the embodiment of the invention and specific examples in the embodiment of the invention is the same as those in the image pickup method of the embodiment of the invention described above, omitting the description.

Hereinafter, a specific embodiment to which the invention is applied will be described in detail with reference to the drawings.

FIG. 1 depicts an exemplary configuration of a digital camera of an embodiment of the invention. This digital camera 1 is a camera which shoots a dynamic image or a static image for coding, and records the resulting encoded data in a recording medium 20. The digital camera 1 has an auto-focus function and a zoom function. Furthermore, the digital camera 1 has an optical system in the inner focus mode and has a telemacro function.

The digital camera 1 is configured of the optical system, an image processing system, a manipulation control system, and an optical drive system. The optical system which obtains an optical image of a subject is configured of a fixed lens 11, a zoom lens 12, a fixed lens 13, and a focus lens 14. The optical drive system controls the operation of the zoom lens 12 and the focus lens 14.

The image processing system is configured of an image pickup device 15 which converts the optical image obtained by the optical system to an image signal by photoelectric conversion, an image processing part 16 which applies a predetermined image process to the image signal, a display image creating part 17 which creates a display image (for example, an image that pixels are thinned) to be displayed on a display part 18, the display part 18 which displays the display image thereon, and a recording medium interface (I/F) 19 which records the image signal (encoded data) encoded by the image processing part 16 on a recording medium 20.

The image pickup device 15 is formed of CCD (Charge Coupled Device), CMOS (Complementary Metal-Oxide Semiconductor) or the like, and it outputs to the image processing part 16 electric charge (it corresponds to a pixel value of the image signal) charged based on control from a timing creating part 27. The image processing part 16 applies image processing such as a noise removal process and an automatic gain process to the image signal inputted from the image pickup device 15, and outputs it to the display image creating part 17 and a sharpness detecting part 28. Moreover, the image processing part 16 encodes the image signal after image processing in accordance with MPEG (Moving Picture Experts Group) 2 mode, etc., and outputs the resulting encoded data to the recording medium interface 19. Besides, it decodes the encoded data read out of the recording medium 20 by the recording medium interface 19, and outputs it to the display image creating part 17.

The display part 18 is formed of a liquid crystal display, etc., and it functions as a finder which confirms the composition of an image by a user in shooting, and functions as a monitor display in reproduction. The recording medium 20 is magnetic tape, an optical disc, a magneto-optical disk, or semiconductor memory, etc., and it is detachable to the recording medium interface 19.

The manipulation control system is configured of an AF/MF switch 21 which switches between the auto-focus mode and the manual focus mode by a user, a MF manipulating part 22 which adjusts a shooting distance by a user in the manual focus mode, a normal/telemacro switch 23 which instructs switching between the normal mode and the telemacro mode by a user, a Zm manipulating part 24 which adjusts a focal length by a user, a shutter switch 25-1 which instructs timing to shoot a static image by a user, a recording switch 25-2 which instructs timing to start or end shooting a dynamic image by a user, a control part 26 which controls each part of the digital camera 1, a timing creating part 27 which controls output timing for electric charge charged in the image pickup device 15, and a sharpness detecting part 28 which computes the sharpness of an image based on a high frequency component of the image signal outputted from the image processing part 16.

The AF/MF switch 21, the MF manipulating part 22, the normal/telemacro switch 23, the Zm manipulating part 24, the shutter switch 25-1, and the recording switch 25-2 are mounted on the outer surface of the main body of the digital camera 1, and they accept manipulations by a user to output manipulation signals corresponding thereto to the control part 26.

The control part 26 controls the display image creating part 17, the recording medium interface 19, the timing creating part 27, and a driver 29 based on the manipulation signals from the AF/MF switch 21 to the recording switch 25-2 and the sharpness from the sharpness detecting part 28 in accordance with a control program stored in memory 26-1. Furthermore, the control part 26 stores a shooting distance corresponding to position information of the focus lens 14 supplied from the driver 29 in the memory 26-1.

A mode switching part 26-2 built in the control part 26 decides transition between the normal mode and the telemacro mode in response to user manipulation to the normal/telemacro switch 23 or in response that the Zm manipulating part 24 is manipulated in the telemacro mode and a focal length of the focus lens 14 is adjusted to the wide angle side.

The optical drive system is configured of the driver 29 which decides the drive quantity of the zoom lens 12 and the focus lens 14, a Zm lens drive part 30 which drives a zoom lens drive motor 31, a zoom lens drive motor 31 which drives the zoom lens 12, a position sensor 32 which detects a current position of the zoom lens 12, a Fc lens drive part 33 which drives a focus lens drive motor 34, the focus lens drive motor 34 which drives the focus lens 14, and a position sensor 35 which detects a current position of the focus lens 14.

The driver 29 makes comparison with the current position of the zoom lens 12 inputted from the position sensor 32 to decide the drive quantity of the zoom lens 12 based on a focal length instructed from the control part 26 or the move destination position of the zoom lens 12, and outputs a drive signal corresponding thereto to the Zm lens drive part 30. Furthermore, the driver 29 makes comparison with the current position of the focus lens 14 inputted from the position sensor 35 to decide the drive quantity of the focus lens 14 based on the shooting distance instructed by the control part 26 or the move destination position of the focus lens 14, and outputs a drive signal corresponding thereto to the Fc lens drive part 33.

Next, the basic operation of the digital camera 1 will be described. When a power source of the digital camera 1 is turned on, the optical system formed of the fixed lens 11 to the focus lens 14 condenses an optical image being a subject onto the image pickup device 15. In addition, the zoom lens 12 is driven in response to user manipulation to the Zm manipulating part 24, and adjusted at a desired focal length. The image pickup device 15 creates an image signal corresponding to the optical image by photoelectric conversion, and outputs it to the image processing part 16. The image processing part 16 applies a predetermined image process to the inputted image signal, and outputs it to the display image creating part 17 and the sharpness detecting part 28.

The display image creating part 17 creates an image signal to be displayed on the display part 18, and outputs it to the display part 18. In the case of the auto-focus mode, the sharpness detecting part 28 detects a high frequency component of the inputted image signal, computes the sharpness of the image based on the detected result, and outputs it to the control part 26. The control part 26 causes the driver 29 to change the shooting distance of the focus lens 14 so that the sharpness from the sharpness detecting part 28 becomes the largest or the maximum. In response thereto, the driver 29 decides the drive quantity of the focus lens 14 based on the current position of the focus lens 14 inputted from the position sensor 35, and outputs the drive signal corresponding thereto to the Fc lens drive part 33.

Then, when shooting is started, the image processing part 16 encodes the image signal having undergone a predetermined image process, and outputs it to the recording medium interface 19. The recording medium interface 19 records the inputted encoded data on the recording medium 20.

Figure 2:
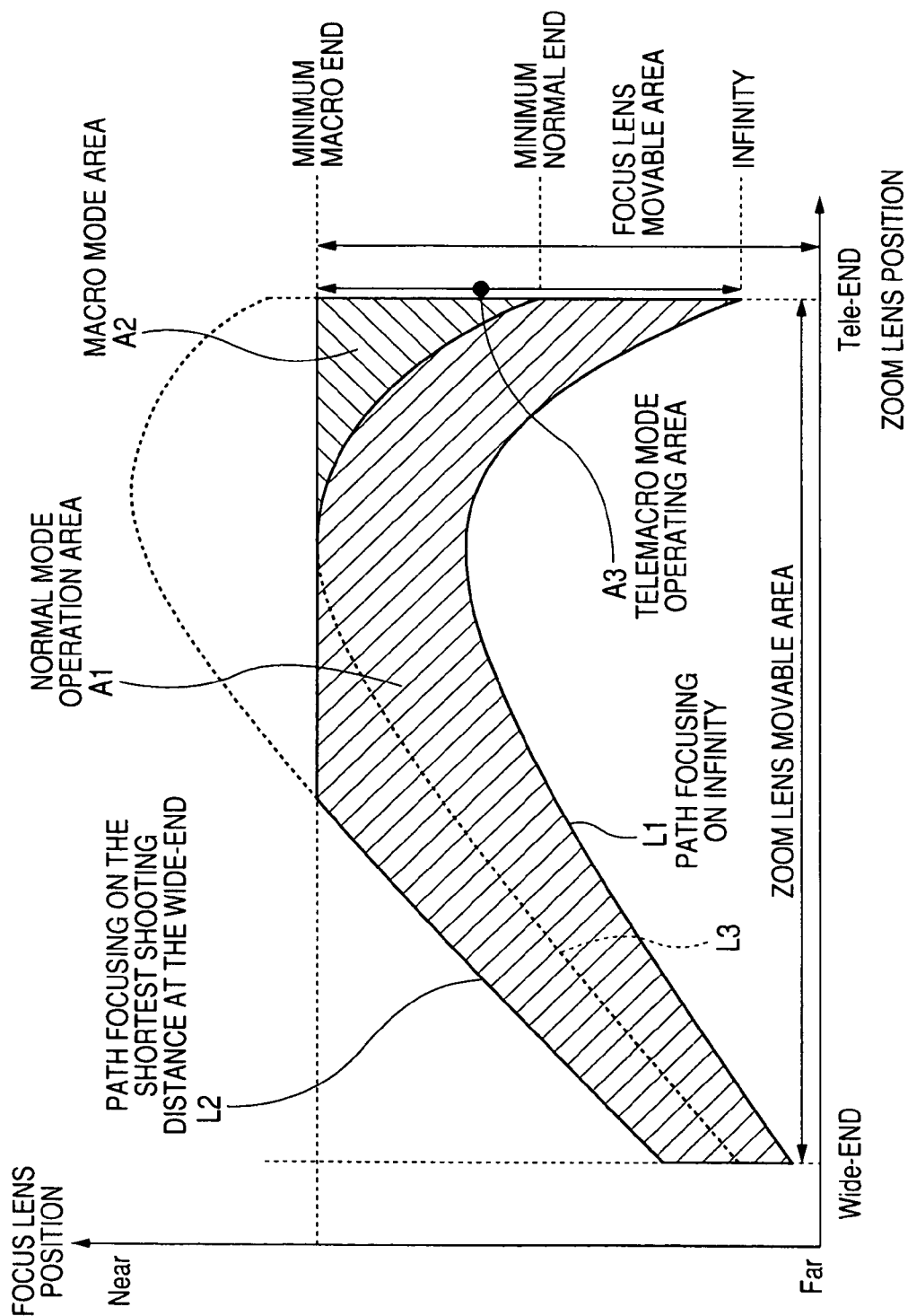
FIG. 2 is a diagram illustrating operation areas in the normal mode, the macro mode, and the telemacro mode in a position space formed of a movable area of the zoom lens and a movable area of the focus lens.

Next, operation areas in the normal mode, the macro mode, and the telemacro mode in a position space formed of a movable area of the zoom lens 12 and a movable area of the focus lens 14 in the digital camera 1 will be described with reference to FIG. 2.

The position space takes a physical movable area of the zoom lens 12 on the horizontal axis in which the left direction (the decreasing direction) is set on the wide-side, and the right direction (the increasing direction) is set on the telescope side. Furthermore, it takes a physical movable area of the focus lens 14 on the vertical axis in which the downward direction (the decreasing direction) is set on the far side, and the upward direction (the increasing direction) is set on the near side. Hereinafter, the ends on the wide side and on the telescope side are called a wide-end and a tele-end, respectively.

In the drawing, curve L1 depicts a path of a point that is formed of a combination of the zoom lens position that focuses on infinity with the focus lens position. Curve L2 depicts a path of a point that is formed of a combination of the zoom lens position that focuses on the shortest shooting distance at the wide-end with the focus lens position. Curve L3 depicts a path of a point that is formed of a combination of the zoom lens position that focuses on the shortest shooting distance at the tele-end with the focus lens position in the normal mode.

Operation area A1 of the normal mode is an area that is surrounded by the curves L1, L2, and L3, and the minimum macro end of the focus lens 14. In the normal mode, the zoom lens position and the focus lens position can be adjusted only in the area A1. Thus, the movable area of the focus lens 14 is from infinity to the minimum normal end.

In the case of the digital camera 1 in the inner focus mode, macro mode area A2 is placed on the tele-end side as shown in the drawing. In addition, in the telemacro mode, since the movable area of the focus lens 14 is extended from infinity to the minimum macro end as the zoom lens 12 is fixed on the tele-end, its operation area A3 is linear as shown in the drawing.

Figure 3:
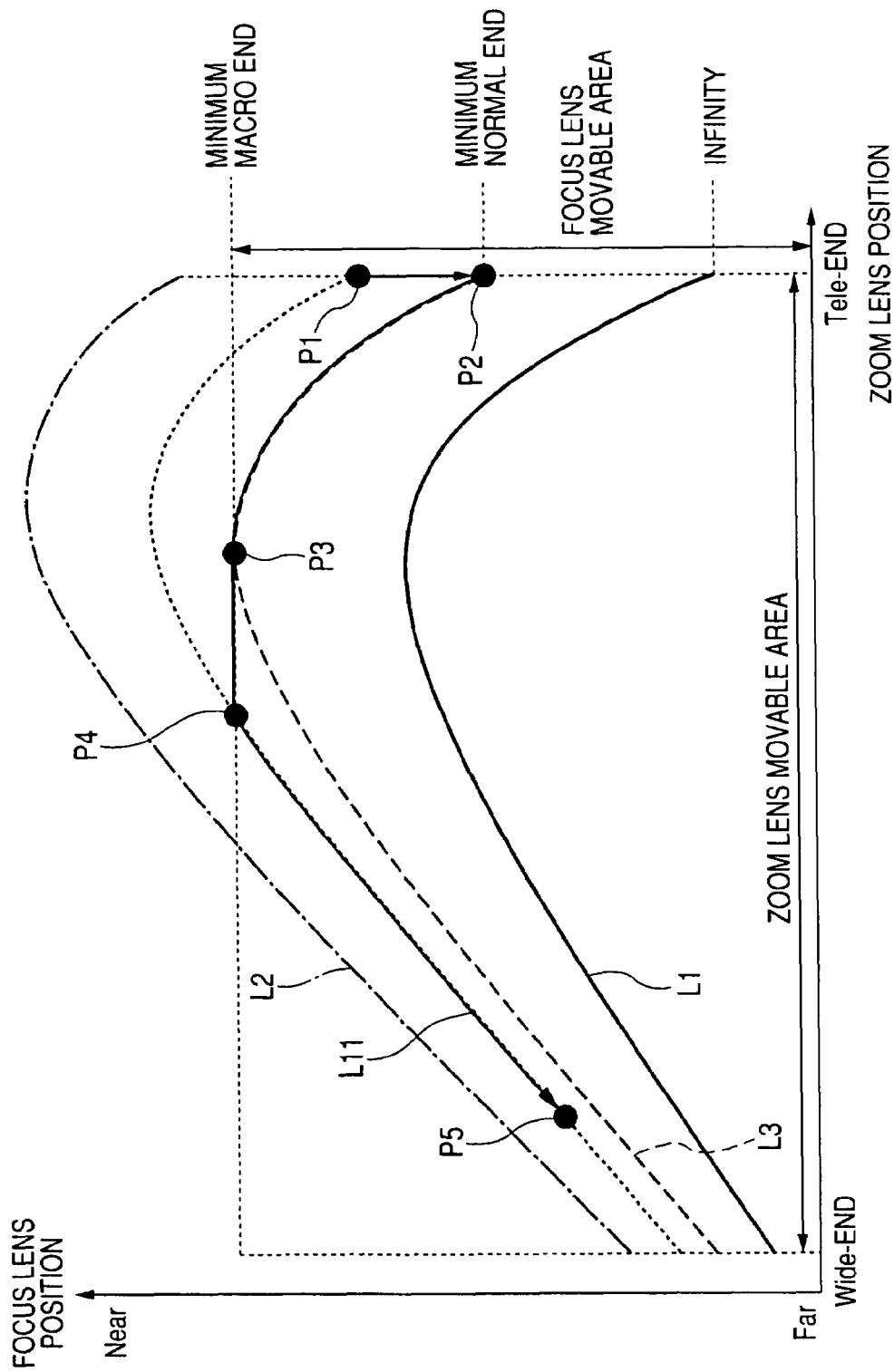
FIG. 3 is a diagram illustrative of the operation when switched from the telemacro mode to the normal mode.

Next, the outline of the operation when it is switched from the telemacro mode to the normal mode as the manual focus mode is held will be described with reference to FIG. 3. In addition, FIG. 3 depicts a position space formed of the movable area of the zoom lens 12 and the movable area of the focus lens 14, as similar to FIG. 2 described above.

In the case where it is switched from the telemacro mode to the normal mode by user manipulation to the normal/telemacro switch 23, or by manipulating the Zm manipulating part 24 in the telemacro mode to adjust a focal length of the focus lens 14 on the wide side, when the position of the focus lens 14 exists in the macro mode area after the shooting distance at that time is stored, the position of the focus lens 14 is moved to the minimum normal end. After that, when the zoom lens 12 is moved, the combination of the zoom lens position with the focus lens position is moved along the path focusing on the shooting distance previously stored. However, when the path does not exist in the operation area A1 in the normal mode, it is moved along the border of the area A1.

For example, suppose it is currently in the telemacro mode, a user manipulates the MF manipulating part 22 into focus, and consequently the combination of the zoom lens position with the focus lens position is located at point P1. In this state, when the normal/telemacro switch 23 is manipulated to instruct switching to the normal mode, the shooting distance corresponding to the point P1 is stored, and then the focus lens 14 is driven and moved to point P2 at the minimum normal end.

After that, when the Zm manipulating part 24 is manipulated by the user, the combination of the zoom lens position with the focus lens position is moved along the curve L3 up to peak P3 of the curve L3 and only the zoom lens position is moved from the peak P3 to point P4 as the focus lens position is fixed on the minimum macro end, unless the MF manipulating part 22 is manipulated. In addition, the point P4 is a point on curve L11 that is a path of a combination of the zoom lens position with the focus lens position, the path focusing on the shooting distance stored and corresponding to the point P1. After the point P4, it is moved along the curve L11 to point P5 corresponding to manipulation to the Zm manipulating part 24.

In addition, after it is switched to the normal mode, when the user manipulates the MF manipulating part 22, the move of the point representing the combination of the zoom lens position with the focus lens position is offset by an amount corresponding to the user manipulation.

According to the operation described above, when focus is to be achieved in manual focus, the shooting distance obtained in the telemacro mode can be used in the normal mode. Therefore, accurate and quick focus can be attained when switched from the telemacro mode to the normal mode.

A manual focus process that implements the operation described above will be described with reference to a flow hart in FIG. 4.

This manual focus process is a process that is implemented when the manual focus mode is selected, where suppose the optical system obtains an optical image and the image processing system creates the image signal.

At Step S1, the mode switching part 26-2 determines whether a user requests transition from the normal mode to the telemacro mode based on the existence of a manipulation signal from the normal/telemacro switch 23 and the descriptions of the manipulation signal. It is determined that the user does not request transition from the normal mode to the telemacro mode, and then the process proceeds to Step S2.

At Step S2, the mode switching part 26-2 determines whether the user requests transition from the telemacro mode to the normal mode based on the existence of a manipulation signal from the normal/telemacro switch 23 or the existence of a manipulation signal from the Zm manipulating part 24 and the descriptions of the manipulation signal. It is determined that the user requests transition from the telemacro mode to the normal mode, and then the process proceeds to Step S3.

At Step S3, the control part 26 sets the operation range of the focus lens 14 from infinity to the minimum normal end. At Step S4, the control part 26 computes the current shooting distance based on current position information about the focus lens 14 obtained from the position sensor 35 and current position information about the zoom lens 12 obtained from the position sensor 32, the information inputted from the driver 29, and stores the information as tracking targets in the memory 26-1. At Step S5, the control part 26 operates in response to the current position of the focus lens 14. More specifically, when the focus lens 14 exists in the macro mode area, the control part 26 controls the driver 29 to move the focus lens 14 to the minimum normal end. When the focus lens 14 exists in the operation area in the normal mode, the control part 26 does not give any instructions to the driver 29. Therefore, in this case, the position of the focus lens 14 is not changed.

At Step S6, the control part 26 reads an A/D value represented by the manipulation signal outputted from the Zm manipulating part 24, decides the drive quantity of the zoom lens 12 corresponding thereto, and computes the move destination position of the zoom lens based on the current position of the zoom lens 12 obtained by the position sensor 32 from the driver 29 and the zoom movable area.

Figure 5:
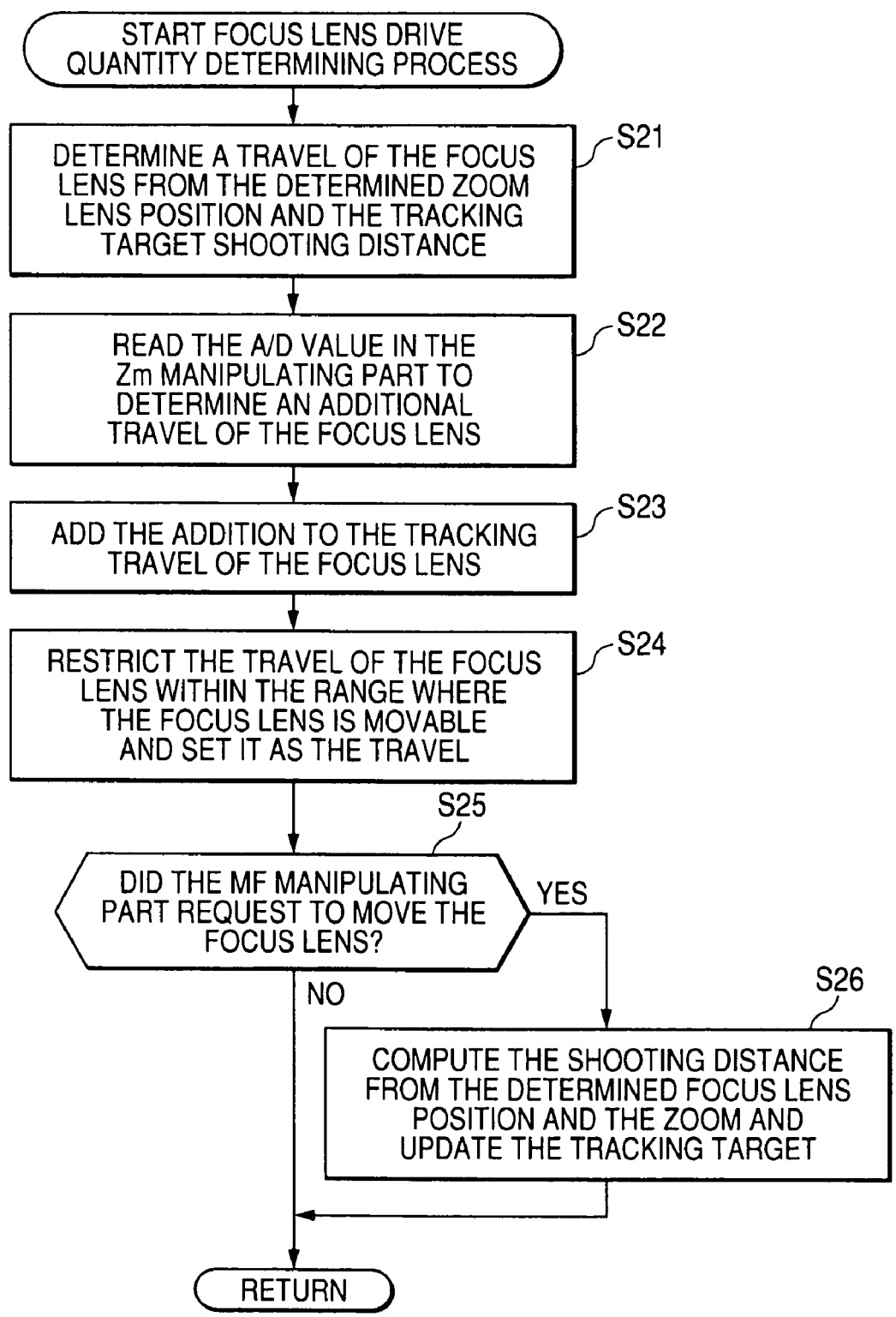
FIG. 5 is a flow hart illustrative of a process at Step S7 shown in FIG. 4.

At Step S7, the control part 26 decides the move destination position of the focus lens 14. A process at Step S7 will be described in detail with reference to a flow hart in FIG. 5.

At Step S21, the control part 26 decides the move destination position of the focus lens 14 based on the move destination position of the zoom lens 12 decided at Step S6 and the shooting distance of the tracking targets stored in the memory 26-1 at Step S4. At Step S22, the control part 26 reads the A/D value represented by the manipulation signal currently being outputted from the MF manipulating part 22, and decides an additional travel of the focus lens 14 corresponding thereto.

At Step S23, the additional travel notified in the process at Step S22 is added to the travel of the focus lens 14 decided in the process at Step S21. At Step S24, the control part 26 computes the move destination position of the focus lens 14 from the current position of the focus lens 14 obtained by the position sensor 35 and the added result in the process at Step 23, and restricts it in the movable area of the focus lens 14. It decides the restricted result as the drive quantity of the focus lens 14.

At Step S25, the control part 26 determines whether the user is manipulating the MF manipulating part 22. It is determined that manipulation is being made, and then the process proceeds to Step S26. At Step S26, the control part 26 computes the shooting distance based on the move destination position of the zoom lens 12 decided at Step S6 and the move destination position of the focus lens 14 represented by the manipulation signal from the MF manipulating part 22, and uses the computed result to update the tracking targets stored in the memory 26-1. In addition, at Step S25, when it is determined that manipulation is not being made, the process at Step S26 is skipped. As described above, the detailed description of the process at Step S7 is ended.

The process returns to Step S8 in FIG. 4. At Step S8, the control part 26 notifies the driver 29 of the move destination position of the zoom lens 12 decided in the process at Step S3 or Step S11 and the move destination position of the focus lens 14 decided in the process at Step S7. The driver 29 outputs to the Zm lens drive part 30 the current position of the zoom lens 12 obtained by the position sensor 32 and the drive signal corresponding to the move destination position of the zoom lens 12 notified to the control part 26. Furthermore, the driver 29 outputs to the Fc lens drive part 33 the current position of the zoom lens 12 obtained by the position sensor 32, the current position of the focus lens 14 inputted by the position sensor 35, and the drive signal corresponding to the move destination position of the focus lens 14 notified to the control part 26. In response thereto, the Zm lens drive part 30 drives the Zm lens drive motor 31, and the Fc lens drive part 30 drives the Fc lens drive motor 34. Thus, the zoom lens 32 and the focus lens 14 are moved to the positions desired by the user.

At Step S9, the control part 26 determines whether the user instructs shooting based on the existence of a manipulation signal from the shutter switch 25-1 or the recording switch 25-2 and the descriptions of the manipulation signal. When the user instructs shooting, the image processing part 16 encodes an image signal, and the recording medium interface 19 records the encoded data on the recording medium 20.

In addition, when it is determined that the user requests transition from the normal mode to the telemacro mode at Step S11, the process proceeds to Step S10. At Step S10, the control part 26 computes the shooting distance before transition to the telemacro mode based on current position information about the focus lens 14 inputted from the driver 29 and obtained by the position sensor 35, and stores it in the memory 26-1.

At Step S11, the control part 26 decides a focal length of the zoom lens 12 on the tele-end, and computes the move destination position of the zoom lens 12. Thus, the zoom lens 12 is moved to the tele-end at Step S8. At Step S12, the control part 26 sets the operation range of the focus lens 14 from infinity to the minimum macro end. After that, the process proceeds to Step S6, and processes after that will be done.

Moreover, at Step S2, also when it is determined that the user does not request transition from the telemacro mode to the normal mode, the process proceeds to Step S6, and processes after that will be done. As described above, the description of the manual focus process is ended.

As described above, since the digital camera 1 to which the invention is adapted implements the manual focus process described above, when focus is to be achieved in manual focus, the shooting distance obtained in the telemacro mode can be used in the normal mode. Accordingly, accurate and quick focus can be attained when switched from the telemacro mode to the normal mode.

It should be understood by those skilled in the art that various modifications, combinations, sub-combinations and alternations may occur depending on design requirements and other factors insofar as they are within the scope of the appended claims or the equivalents thereof.

What is claimed is:

1. An image pickup apparatus with a lens assembly comprising a movable focus lens, having a manual focus function which adjusts a shooting distance by a user, and a movable zoom lens having a zoom function between a tele-end and a wide-angle end which changes a focal length of said lens assembly, said lens assembly having a telemacro shooting function for setting the focal length on the tele-end to focus on a subject at a close distance that may not achieve focus on said subject in normal shooting, the image pickup apparatus comprising:
    a shooting module responsive to a switching instruction to switch between a telemacro mode where said telemacro shooting function is operable and a normal mode where said telemacro shooting function is not operable;
    a zoom lens drive module which drives said zoom lens to adjust the focal length;
    a focus lens drive module which drives said focus lens to adjust the shooting distance;
    a storing module which stores the shooting distance established in the telemacro mode before switching from the telemacro mode to the normal mode when said switching instruction is received; and
    a control module, responsive to user manipulation to change the focal length of the lens assembly, to control the focus and zoom lens drive modules to move a combination point representing the combination of the position of the focus lens and the position of the zoom lens along a path whereat the lens assembly is focused at the shooting distance stored in the storing module when the shooting module switches from the telemacro mode to the normal mode.

2. The image pickup apparatus according to claim 1, wherein when the shooting module has switched from the telemacro mode to the normal mode, the control module is operable to:
    control the focus lens drive module to move the position of the focus lens to a minimum end in the normal mode if the position of the focus lens is at a distance closer than a said minimum end in the normal mode;
    move the combination point of the position of the focus lens with the position of the zoom lens along a path that is focused at the tele-end of the zoom lens; and then move the combination point along a path that is focused at the shooting distance stored in the storing module.

3. The image pickup apparatus according to claim 1, wherein the shooting module responds to user manipulation of a switch or user manipulation of the zoom lens to a wide side to switch between the telemacro mode and the normal mode.

4. A method of controlling a lens assembly of an image pickup apparatus, said lens assembly including focus and zoom lenses and having a manual focus function which adjusts a shooting distance by a user, and a zoom function between a tele-end and a wide-angle end which changes a focal length of said lens assembly, said lens assembly having a telemacro shooting function for setting the focal length on the tele-end to focus on a subject at a close distance that may not achieve focus on said subject in normal shooting, the image pickup method comprising the steps of:
    responding to a switching instruction to switch between a telemacro mode where said telemacro shooting function is operable and a normal mode where said telemacro shooting function is not operable;
    storing the shooting distance established in the telemacro mode before switching from the telemacro mode to the normal mode when said switching instruction is received; and
    responding to user manipulation to change the focal length of the lens assembly, to control the focus and zoom lenses to move a combination point representing the combination of the position of the focus lens and the position of the zoom lens along a path whereat the lens assembly is focused at the stored shooting distance when the telemacro mode is switched to the normal mode in response to the switching instruction.

5. A program embodied in a computer readable medium for instructing a processor to control a lens assembly of an image pickup apparatus, said lens assembly including focus and zoom lenses and having a manual focus function which adjusts a shooting distance by a user, and a zoom function between a tele-end and a wide-angle end which changes a focal length of said lens assembly, said lens assembly having a telemacro shooting function for setting the focal length on the tele-end to focus on a subject at a close distance that may not achieve focus on said subject in normal shooting, the program instructing the processor to perform the steps of:
    responding to a switching instruction to switch between a telemacro mode where said telemacro shooting function is operable and a normal mode where said telemacro shooting function is not operable;
    storing the shooting distance established in the telemacro mode before switching from the telemacro mode to the normal mode when said switching instruction is received; and
    responding to user manipulation to change the focal length of the lens assembly, to control the focus and zoom lenses to move a combination point representing the combination of the position of the focus lens and the position of the zoom lens along a path whereat the lens assembly is focused at the stored shooting distance when the telemacro mode is switched to the normal mode.

* * * * *